March 19, 1968 — D. B. CAVATAIO — 3,373,525
PLANT PLASTIC CAP
Filed Sept. 2, 1966
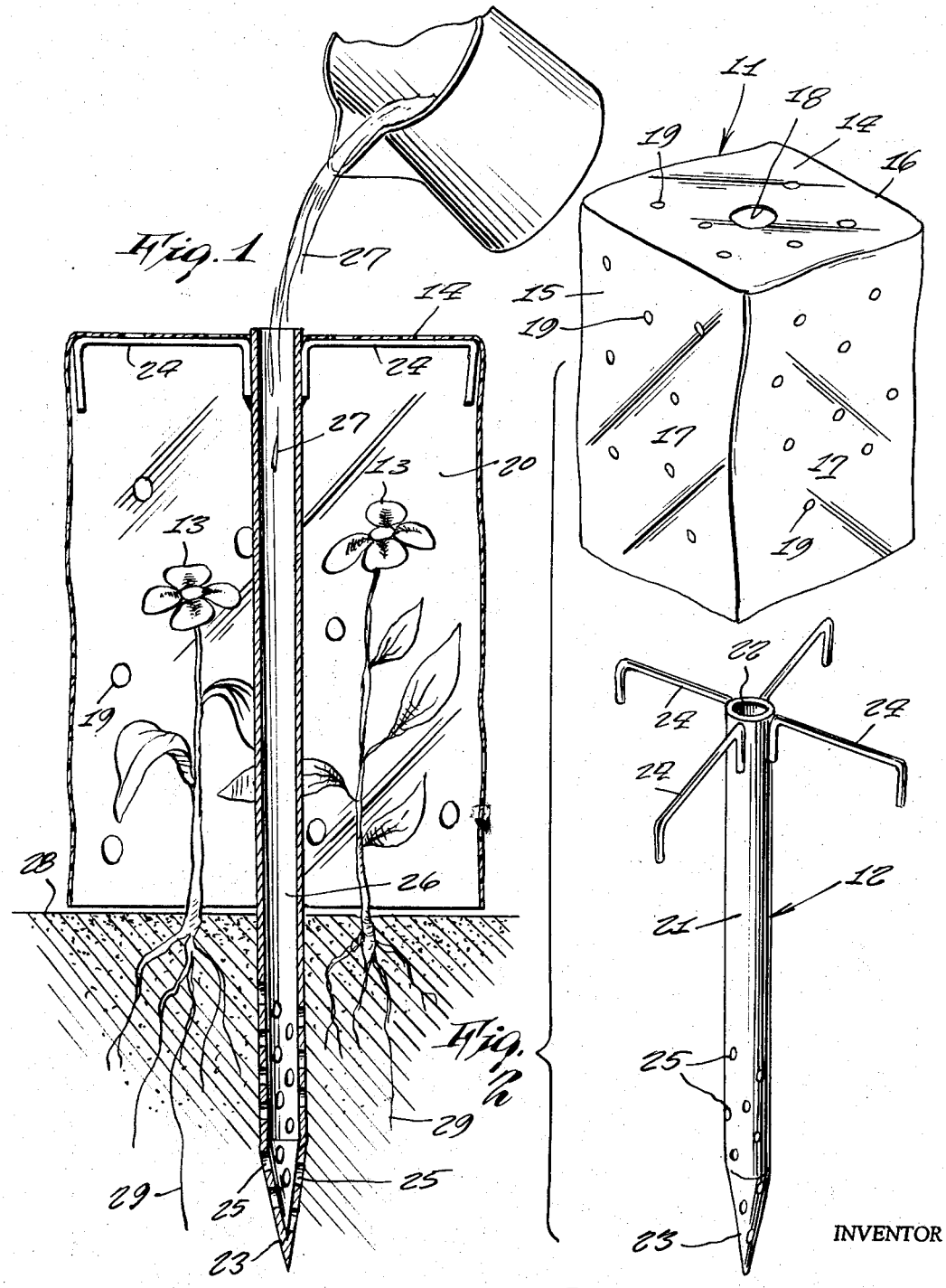
INVENTOR
DOLORES B. CAVATAIO

3,373,525
PLANT PLASTIC CAP
Dolores B. Cavataio, 2850 S. 128th St.,
New Berlin, Wis. 53151
Filed Sept. 2, 1966, Ser. No. 576,872
2 Claims. (Cl. 47—27)

ABSTRACT OF THE DISCLOSURE

An enclosure for a young plant to be protected against adverse cold weather before springtime sets in, the enclosure comprising a clear, transparent, plastic bag to admit sun rays therethrough, and with breather perforations for admitting air to the plant, the bag being supported on a hollow post open at its lower end for receiving water to be transported to the plant roots.

---

This invention relates to horticulture accessories, more specifically it relates to protective canopies for seedlings and young plants.

A principal object of the present invention is to provide a plant plastic cap for purpose of growing seedlings and young plants early in the season while weather is yet cold and the wind too raw for plants growth.

Another object of the present invention is to provide a plant plastic cap having self-contained support means for placement over a young plant or seedling and which permits the penetration of sunlight therethrough.

Yet another object of the present invention is to provide a plastic plant cap having self-contained means to permit watering and delivering of nutrients into the soil in the vicinity of the plant roots without the necessity of removing the plant cap from over the plant.

Yet another object of the present invention is to provide a plastic plant cap having self-contained means to allow fresh air to circulate around the plant while the same is protected from excessive winds on the outside.

Other objects of the present invention are to provide a plastic plant cap which is simple in design, inexpensive to manufacture, rugged in construction, easy to use and efficient in operation.

These and other objects will be readily evident upon a study of the following specification and the accompanying drawing wherein:

FIGURE 1 is a side cross-sectional view of the present invention shown in operative use;

FIGURE 2 is an exploded perspective view of the parts comprising the present invention.

Referring now to the drawing in detail, the numeral 10 represents a plastic plant cap assembly according to the present invention wherein there is a plastic canopy 11 and a central support 12, support providing a means for holding the canopy 11 over the plant 13.

The canopy 11 is made preferably from plastic which is transparent so as to admit the sun's rays therethrough, or if preferred it may be made tinted to eliminate certain rays if the device is to be used in relatively excessively hot areas. The canopy includes a top wall 14 and a depending side wall 15 which bounds the peripheral edge 16 of the top wall 14. The side wall 15 may be made in a plurality of panels 17 as shown in FIGURE 2 of the drawing. A relatively large central opening 18 is provided in the top wall 14 and a plurality of relatively small openings 19 are provided in the top wall and side wall as well. The openings 19 provide means for fresh air to enter into the compartment 20 formed beneath the canopy 11.

The support member 12 comprises an elongated tube 21 which may be made preferably from plastic material, the tube 21 having an opening 22 at its upper end and being pointed at its lower end as shown at 23. A plurality of radially extending arms 24 are rigidly secured to the tube 21 adjacent its upper end, the arms providing support means for the canopy 11. The lower portion of the tube 11 is provided with a series of openings 25 which communicate with the central opening 26 of the tube so to permit water or liquid nutrients 27 within the tube to be drained therethrough outwardly.

In operative use the support 12 is driven into the ground 28 with the pointed end 23 downward. The canopy 11 is then placed over the support to shelter the plants 13 as shown in FIGURE 1 of the drawing. The plants are thus protected against adverse temperatures, yet are able to receive the sun's rays through the canopy which protects them. When it is desired to administer water or liquid nutrients to the plants, these are poured into the opening 22 of the tube 21, the liquid dropping to the lower end of the tube and outwardly through the openings 25 into the earth 28 and in the vicinity of the plant roots 29.

Thus a protective canopy has been provided for young plants or seedlings.

While various changes may be made in the detailed construction it is understood that such changes will be within the spirit and scope of the present invention as is defined by the appended claims.

I claim:

1. In a protective cap for plants and seedlings, the combination of a canopy and a support, said support supporting said canopy over a plant or seedling, said canopy having self-contained means to permit the sun's rays to pass therethrough, ventilated air openings through said canopy to allow movement of air therethrough, said canopy preventing raw winds or adverse temperatures to easily reach said plant, said support having self-contained means for administering water or nutrients to the roots of said seedlings or plants, said canopy comprising an inverted container made of relatively thin plastic material, said material being transparent, said canopy including a top wall and a side wall all around, said side wall having a lower edge defining an opening, said opening communicating with a central chamber beneath said canopy, said canopy having an enlarged central opening in the upper said wall, a plurality of relatively smaller openings in said upper wall and said side wall defining said ventilation openings, said support comprising an elongated tubular member having an opening at its upper end and being pointed at its lower opposite end, said lower end having a plurality of openings therethrough to permit communication with a central opening within said tube, and a plurality of radially extending arms adjacent the upper end of said tube to provide support means for said canopy.

2. The combination as set forth in claim 1 wherein said central opening in the upper end of said canopy is in alignment with the upper opening in said tube of said support to permit pouring of water or liquid nutrients into said tube to feed the roots of said plant.

References Cited

UNITED STATES PATENTS

| 74,879 | 2/1868 | Bartlett | 47—28 |
| 96,468 | 11/1869 | Nelson | 47—29 |
| 1,589,400 | 6/1926 | Klinglesmith | 47—44 |
| 2,435,539 | 2/1948 | Gould | 47—27 XR |
| 2,990,647 | 7/1961 | Himebaugh | 47—48.5 XR |
| 3,214,865 | 11/1965 | Rosenvold et al. | 47—29 |

FOREIGN PATENTS

| 336,508 | 1/1904 | France. |
| 180,600 | 1/1936 | Switzerland. |

ROBERT E. BAGWILL, Primary Examiner.